United States Patent Office 3,634,417
Patented Jan. 11, 1972

3,634,417
PURIFICATION OF 7α-AMINOARYLACETAMIDO
Δ³-4-CARBOXY-CEPHALOSPORINS
John Attenburrow, Uxbridge, Middlesex, England, assignor to Glaxo Laboratories Limited, Middlesex, England
No Drawing. Filed Apr. 3, 1969, Ser. No. 813,286
Claims priority, application Great Britain, Apr. 5, 1968, 16,593/68
Int. Cl. C07d 99/24
U.S. Cl. 260—243
6 Claims

ABSTRACT OF THE DISCLOSURE

Purification of a cephalosporin derivative having a 7α-aminoarylacetamido side chain by precipitating as a crystalline salt by reaction with benzylamine, a corresponding compound having the amino group protected, separating the salt, and converting the salt to the corresponding acid, the protective group being removed.

This invention relates to a method of purifying cephalosporin derivatives and to the intermediates utilised therein.

Various cephalosporin derivatives have utility as antibiotics, but much difficulty has been experienced in preparing such compounds in good yield and purity. This is particularly the case with cephalosporin derivatives having a 7α-aminoarylacetamido side chain; such compounds and intermediates in their preparation are not easily obtained in a pure form, gelatinous solids being not infrequently formed. It has now been found that benzylamine salts of certain precursors of such derivatives have exceptional properties which render them particularly useful as intermediates in the purification of these derivatives. These salts possess the advantage that they can be recovered in a well-defined crystalline form from which the desired end product can be obtained in good yield and purity. Whereas in the absence of the process according to the invention the purity of the end product may leave much to be desired as a pharmaceutical grade material, it is possible by the method according to the invention to prepare end products of high purity.

According to the invention, therefore, there is provided a method of preparing a compound having the formula:

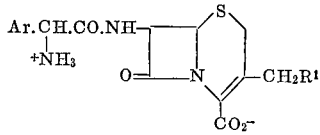

(I)

wherein Ar is an aromatic group (including heterocyclic aromatic), $R^1$ is —H, OAc, —OH or residue of a substituting nucleophile e.g. $N_3$ or an O-ether group which includes the step of forming a salt of a compound of the formula:

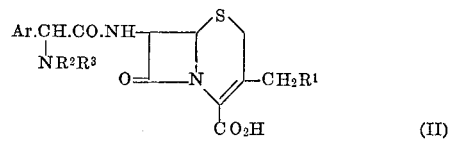

(II)

wherein Ar and $R^1$ have the above meanings, $R^2$ is a protecting group and $R^3$ is hydrogen or a protecting group which may form a ring system with $R^2$, with benzylamine, preferably followed by separation of the salt, conversion back to the corresponding acid and formation of the compound of Formula I.

The invention, furthermore, provides a method of making said salt of a compound having Formula II above, which comprises contacting benzylamine therewith.

The benzylamine salts of compounds of Formula II are novel and also form part of the invention.

The group Ar in Formulae I and II may be phenyl, or phenyl substituted by, for example, one or more halo, hydroxy, lower alkyl, nitro, amino, substituted amino, lower alkanoyl, lower alkoxy or lower alkylmercapto substituents, or it may be a heterocyclic group e.g. thienyl.

The protecting group $R^2$ (and/or $R^3$) is conveniently one which can be removed by hydrolysis without affecting the rest of the molecule, especially the lactam and 7β-amido linkages. Protected groups include urethane, arylmethyl (e.g. trityl)-amino, arylmethyleneamino, sulphenylamino and enamine types. Such groups can in general be removed by one or more reagents selected from dilute mineral acids, e.g. dilute hydrochloric acid, concentrated organic acids, e.g., concentrated acetic acid, and trifluoroacetic acid, and liquid hydrogen bromide at very low temperatures, e.g., —80° C. A convenient protecting group is the t-butoxycarbonyl group, which is readily removed by hydrolysis with dilute mineral acid, e.g., dilute hydrochloric acid, or preferably with a strong organic acid (e.g. formic acid or trifluoroacetic acid) e.g. at a temperature of 0–40° C., preferably at room temperature (15–25° C.). Another convenient protecting group is the β,β,β-trichloroethoxy carbonyl group which may be split off by an agent such as zinc in acetic acid, formic acid, lower alcohols or pyridine.

Typical protecting groups and their methods of removal are illustrated in the following table:

| Type | Example | Usual name and analogues, etc. | Usual method of removal |
|---|---|---|---|
| Urethane | HNCOCH₂Ph (∥O) | Benzyloxycarbonyl, p-methoxy | HBr/AcOH (Neat); CF₃COOH (Neat); Liq. HBr at —80° C. |
| Urethane | HNCOC(CH₃)₃ (∥O) | t-Butoxycarbonyl | Dil. acid (HCl); CF₃COOH (Neat). |
| Urethane | HNCOCHPh₂ (∥O) | Diphenylmethoxycarbonyl | CF₃COOH (Neat); Dil. HCl, etc. |
| Urethane | HNCO—(1-adamantyl) (∥O) | 1-adamantyloxycarbonyl | Dil. HCl. |
| Arylmethyl | HNCPh₃ | Trityl | AcOH plus H₂O; Dil. HCl. |

| Type | Example | Usual name and analogues, etc. | Usual method of removal |
|---|---|---|---|
| Sulphenyl | HN—S—C₆H₄—NO₂ | o-Nitrophenylsulphenyl, p-nitro | Dil. HCl; NaI or $Na_2S_2O_3$; pH 2–4 |
| Enamine | (enamine structure with N–H, C–CH₃, O, C–H, C–R) | β-Dicarbonyl: R=OEt, ethyl acetoacetate; R=CH₃, acetylacetone; R=Ph, benzoylacetone; R=OMe, methyl acetoacetate; R=C₂H₅, propionylacetone; and many other β-diketones. | Acid labile in varying degree; Dil. AcOH or HCl, etc. |
| Arylmethylene | N=CH–C₆H₄–OH | Anil (similar to β-dicarbonyl) from salicylaldehyde: 5-chlorosalicylaldehyde; 3,5-dichlorosalicylaldehyde; 2-hydroxy-1-naphthaldehyde; 3-hydroxy-pyridine-4-aldehyde. | Dil. HCl; Formic acid. |
| Urethane | $HN \cdot CO \cdot OCH_2CCl_3$ | β,β,β-trichloroethoxycarbonyl | Reducing agents, e.g., Zn/acetic acid. |

Formation of the salt is suitably carried out in the liquid phase e.g. in an inert organic solvent or in water. The solvent may be a ketone, such as acetone, methyl ethyl ketone or methyl isobutyl ketone, or an ester such as ethyl acetate or butyl acetate.

The reaction between benzylamine referred to herein for convenience as "the organic base," and the compound of Formula II should be effected under conditions of temperature and mixing such that the desired salt is precipitated in a form which is crystalline, filterable and washable. Thus on a small scale the organic base, or a solution thereof, may be added rapidly to a solution of the compound of Formula II at a relatively low temperature, such as 25–30° C. On a larger scale, the organic base is advantageously added slowly to a solution of the compound of Formula II at an elevated temperature, such as 40–60° C., suitably 50° C. During the addition of organic base, the mixture should be agitated. The reaction mixture is cooled and allowed to stand long enough for the product to crystallise out fully. Conventional methods of assisting crystallisation may be employed when necessary. The product is then separated from the mother liquor e.g. by filtration or centrifugation.

The salt may be further purified by one or more recrystallisations from a suitable solvent, such as acetone or methyl ethyl ketone.

The compound of Formula II may be regenerated from its salt by treatment with an acid, conveniently an acid the corresponding organic base salt of which is water soluble. A preferred method of regenerating the compound of Formula II comprises acidifying its salt with an aqueous acid and extracting the desired product into an organic solvent such as ethyl acetate or methyl isobutyl ketone. An acid addition salt of the organic base remains in the aqueous phase. Suitable acids include strong mineral acids e.g. hydrochloric and sulphuric acids. Care should be taken at this stage to eliminate the organic base from the organic phase and hence from the cephalosporin.

The conversion of the compound of Formula II to a compound of Formula I is accomplished by removal of the protecting group(s) $R^2$ and/or $R^3$ by any suitable method, e.g. hydrolysis or hydrogenolysis, depending on the nature of the protecting group(s) $R^2$ and/or $R^3$. Clearly the method of removal must be one that does not cause degradation of the other parts of the molecule. When $R^3$=H and $R^2$=t-butyloxycarbonyl, the latter may be removed by treatment with glacial acetic acid containing hydrochloric acid, suitably at an elevated temperature, such as 40°.

It will be realised that in some cases the protecting group(s) $R^2$ and/or $R^3$ may be removed simultaneously with the decomposition of the organic base salt.

The crystallisation and isolation of the salt substantially eliminates starting materials and byproducts formed earlier in the overall process. Such an impurity is D-phenylglycine, when making compounds of Formula I in which Ar is an unsubstituted phenyl group. Impurities with the L-configuration are also removed at this same stage. These impurities considerably reduce the yield of compounds of Formula 1, when such compounds are prepared directly from compounds of Formula II without proceeding through the salt and the process of this invention.

Compounds of Formula II may be made, inter alia, by acylating a compound of the formula:

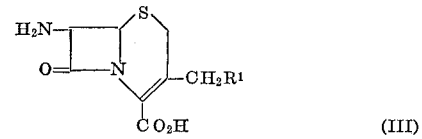

(III)

where $R^1$ has the above-defined meaning, with an acid addition salt thereof, with an amino protected α-aminoarylacetic acid or amide-forming derivative thereof.

In order that the invention may be well understood the following examples are given by way of illustration only:

EXAMPLE 1

(a) 7β-(D-α-t-butyloxycarbonylamino - α - phenylacetamido) - 3 - methylceph-3-em-4-carboxylic acid benzylamine salt Ethyl chloroformate (7.9 ml.) was added to a solution of D-(—)-α-t-butyloxycarbonylamino-α-phenylacetic acid (18.75 g.) in acetone (187.5 ml.) containing triethylamine (12.0 ml.) and the reaction mixture cooled to —10°. The temperature rose to 0° and triethylamine hydrochloride was precipitated.

After ten minutes at 0°, the resulting suspension was added to a solution of 7β-amino-3-methylceph-3-em-4-carboxylic acid (12.84 g.) in water (120 ml.) containing triethylamine (8.4 ml.) at 40°. The resulting solution was rapidly heated to 40° and after 20 minutes stirring was diluted with ethyl acetate (125 ml.) and N-hydrochloric acid containing 5% sodium chloride (100 ml.). The mixture was separated and the organic layer washed three times with 10% sodium chloride solution. The combined extract and a backwash (50 ml.) were evaporated to dryness. The residue was redissolved in ethyl acetate (75 ml.) and the solution treated with benzylamine (8 ml.) in ethyl acetate (50 ml.) when the product crystallised. The suspension was diluted with ether (150 ml.) and cooled to 0°. The benzylamine salt was collected by filtration, washed with ether, and dried at 40° in vacuo to give 25.35 g. of white crystals (76.2% of theory, based on the cephalosporin intermediate), $[\alpha]_D+65°$ (c., 1.0 in $H_2O$, $\lambda_{max}$ $H_2O$ 261 nm.

$E_{1cm.}^{1\%}$ 148, $\lambda_{min.}$ 239 nm. $E_{1cm.}^{1\%}$ 116

(b) 7β-(D-α-amino-α-phenylacetamido)-3-methylceph-3-em-4-carboxylic acid

7β-(D - α - t - butyloxycarbonylamino-α-phenylacetamido)-3-methylceph-3-em-4-carboxylic acid benzylamine salt (13.3 g.) was converted to the free acid by acidification with N-hydrochloric acid (30 ml.) and extracted into ethyl acetate (75 ml.). The ethyl acetate extract was evaporated to dryness and the residue treated with glacial acetic acid (24 ml.) and concentrated hydrochloric acid (4 ml.) and the solution maintained at 30° for 20 minutes. The solution was then evaporated to dryness and the residue redissolved in water (35 ml.). The solution was clarified with kieselguhr and the filter washed with water (5 ml.). The filtrate was adjusted to pH 4.5 with triethylamine. The resulting suspension was diluted with acetone (120 ml.) and cooled to 0°. The title compound was collected by filtration, washed with acetone and with ether and dried at 40° in vacuo, to give 6.05 g. of white crystals (72% of theory, $[\alpha]_D+152°$ (c., 1.0 in $H_2O$) $\lambda_{max}$ $H_2O$ 261 nm.

$E_{1cm.}^{1\%}$ 240, $\lambda_{min.}$ 237 nm. $E_{1cm.}^{1\%}$ 180

Electrophoresis confirmed the absence of α-phenylglycine.

EXAMPLE 2

(a) 7β - (D-α-t - butyloxycarbonylamino-α-phenylacetamido) - 3 - acetoxymethylceph - 3-em-4-carboxylic acid benzylamine salt D(—)-α-t-butyloxycarbonylamino-α-phenylacetic acid (18.75 g.) was treated with ethyl chloroformate (7.9 ml.) and triethylamine (12.0 ml.) as in Example 1. The resulting suspension was added to a solution of 7β-amino-3-acetoxy-methylceph-3-em - 4 - carboxylic acid, 7-ACA (16.3 g.) in water (120 ml.) containing triethylamine (8.4 ml.) at room temperature.

The resulting solution was stirred at room temperature for 5 minutes and diluted with ethyl acetate (125 ml.) and N-hydrochloric acid containing 5% sodium chloride (100 ml.). The mixture was separated and the organic layer washed with 10% sodium chloride solution (3× 65 ml.). The organic layer, combined with an ethyl acetate (50 ml.) backwash, was dried over sodium sulphate and evaporated to dryness. The residue was redissolved in ethyl acetate (100 ml.) and treated with benzylamine (8 ml.) in ethyl acetate (50 ml.), when the benzylamine salt crystallised. The suspension was diluted with ether (150 ml.) and cooled to 0° for two hours. The title compound was collected by filtration, washed with ether and dried at 40° in vacuo to give 25.78 g. of the salt (70.2% of theory from 7-ACA), $[\alpha]_D+42.5°$ (c., 0.5 in $H_2O$), $\lambda_{max}$. $H_2O$ 260 nm.

$E_{1cm.}^{1\%}$ 147, $\lambda_{min.}$ 238 nm. $E_{1cm.}^{1\%}$ 115

(b) 7β-(D-α-amino-α-phenylacetamido)-3-acetoxymethylceph-3-em-4-carboxylic acid

7β - (D-α-t-butyloxycarbonylamino - α - phenylacetamido)-3-acetoxymethylceph - 3 - em - 4 carboxylic acid benzylamine salt (10 g.) was converted to the free acid by acidification with N-hydrochloric acid (20 ml.) and extracted into ethyl acetate (50 ml.). The ethyl acetate extract was evaporated to dryness and the residue redissolved in glacial acetic acid (20 ml.) and treated with concentrated hydrochloric acid (3.5 ml.) at 40° for 10 minutes. The solution was evaporated to dryness and the residue dissolved in water (15 ml.), treated with charcoal (0.5 g.) and filtered; the residue was washed twice with water (each 2.5 ml.). The filtrates were combined and shaken with Amberlite liquid anion exchanger, LA2 (10 ml.) and ether (50 ml.) when the product crystallised from the aqueous layer. The ethered layer was decanted and the aqueous slurry washed first with LA2 (5 ml.) in ether (50 ml.) and finally with fresh ether (50 ml.). The slurry was diluted with acetone (60 ml.) and the title compound collected by filtration, washed with acetone and with ether, and dried at 40° in vacuo, to give 4.70 g. of white crystals (71% of theory), $[\alpha]_D+79°$ (c., 1.0 in N/10 HCl), $\lambda_{max}$. $H_2O$ 261 nm.

$E_{1cm.}^{1\%}$ 213, $\lambda_{min.}$ 236 nm. $E_{1cm.}^{1\%}$ 158

Electrophoresis confirmed the absence of α-phenylglycine.

EXAMPLE 3

(a) 7β - (D-α-t-butyloxycarbonylamino - α - phenylacetamido)-3 - azidomethylceph - 3 - em - 4 - carboxylic acid benzylamine salt D(—)-α-t - butyloxycarbonylaminophenylacetic acid (4.7 g.) was treated with ethyl chloroformate (2.0 ml.) and triethylamine (3.0 ml.) as in Example 1. The resulting suspension was added to a solution of 7β-amino-3-azidomethyl-ceph - 3 - em - 4 - carboxylic acid (3.83 g.) in water (30 ml.) and triethylamine (2.1 ml.). The resulting solution was stirred at 30° for 10 minutes, diluted with ethyl acetate (50 ml.) and N-hydrochloric acid (25 ml.) and separated. The organic layer was washed three times with 10% sodium chloride solution. The combined extract and backwash were evaporated to dryness. The residue was redissolved in methyl isobutyl ketone (50 ml.) and treated with benzylamine (2 ml.) when the product slowly crystallised. The benzylamine salt was collected by filtration, washed with ether and dried at 40° in vacuo, 4.89 g. (54.7% of theory based on the cephalosporin intermediate), $[\alpha]_D+40°$ (c., 0.5 in 25% EtOH), $\lambda_{max}$. $H_2O$ 261 nm.

$E_{1cm.}^{1\%}$ 130, $\lambda_{min.}$ 235 nm. $E_{1cm.}^{1\%}$ 100

(b) 7β-(D-α-amino-α-phenylacetamido)-3-azidomethylceph-3-em-4-carboxylic acid

This was obtained from the benzylamine salt of Example 3(a) in a manner analogous to Examples 1(b) and 2(b).

EXAMPLE 4

(a) 7β - (D-α-t-butyloxycarbonylamino - α - phenylacetamido)-3 - acetoxymethylceph - 3 -em - 4 - carboxylic acid, benzylamine salt Triethylamine (12.0 ml.) was added to a solution of D(—)-α-t - butyloxycarbonylamino-α-phenyl-acetic acid (18.75 g.) in dioxan (187.5 ml.) containing ethyl chloroformate (7.9 ml.) cooled to 11°; the temperature rose to 28° and triethylamine hydrochloride was precipitated. After three minutes the resulting suspension was added to a solution of 7-ACA (16.3 g.) in water (120 ml.) containing triethylamine (8.4 ml.) at room temperature.

The resulting solution was stirred at room temperature for 5 minutes and diluted with ethyl acetate (125 ml.) and N-hydrochloric acid containing 5% sodium chloride (100 ml.). The mixture was separated and the organic layer washed with 10% sodium chloride solution (3× 65 ml.). The organic layer, combined with an ethyl acetate (50 ml.) backwash, was dried over sodium sulphate and evaporated to dryness. The residue was redissolved in ethyl acetate (100 ml.) and treated with benzylamine (8 ml.) in ethyl acetate (50 ml.) when the benzylamine salt crystallised. The suspension was diluted with ether (150 ml.) and cooled to 0° for two hours. The product was collected by filtration, washed with ether and dried at 40° in vacuo to give 25.78 g. of the salt (70.2% of theory from 7-ACA), $[\alpha]_D +42.5°$ (c., 0.5 in $H_2O$), $\lambda_{max.}$ $H_2O$ 260 nm.

$E^{1\%}_{1\text{ cm.}}$ 147, $\lambda_{min.}$ 238 nm. $E^{1\%}_{1\text{ cm.}}$ 115

(b) 7β-(D-α-amino-α-phenylacetamido)-3-acetoxymethylceph-3-em-4-carboxylic acid

7β - (D-α-t-butyloxycarbonylamino - α - phenylacetamido)-3 - acetoxymethylceph - 3-em-4-carboxylic acid benzylamine salt (10 g.) was converted to the title compound in a manner analogous to that described in Example 2(b).

EXAMPLE 5

(a) 7β - (D(—)-α-t-butyloxycarbonylamino-α-phenylacetamido) - 3 - methylceph-3-em-4-carboxylic acid benzylamine salt Ethyl chloroformate (7.9 ml.) was added to a solution of D(—)-α-t-butyloxycarbonylamino-α-phenylacetic acid (18.75 g.) in dioxan (187.5 ml.) containing triethylamine (12.0 ml.) cooled to +11°. The temperature rose to 14° and triethylamine hydrochloride precipitated. After four minutes the suspension was added to a solution of 7β-amino-3-methylceph-3-em-4-carboxylic acid (12.84 g.) in water (120 ml.) containing triethylamine (8.4 ml.) at 40°. The resulting solution was held at 40° for 20 minutes and diluted with methyl isobutyl ketone (125 ml.) and N - hydrochloric acid containing 5% sodium chloride (100 ml.). The mixture was separated and the organic layer washed three times with 10% sodium chloride solution, all followed by a methyl isobutyl ketone backwash (50 ml.). The combined solvent layers were evaporated to 100 ml. and treated with benzylamine (8 ml.) in methyl isobutyl ketone (50 ml.). The benzylamine salt rapidly crystallised and the mixture was cooled to 0° after dilution with diethyl ether (150 ml.). The benzylamine salt was collected by filtration, washed with ether and dried at 40° in vacuo to yield 28.63 g. of offwhite crystals (86.2% of theory, based on cephalosporin intermediate) $[\alpha]_D +67°$ (c., 1.0 in $H_2O$), $\lambda_{max.}$ $H_2O$ 261 nm. $E^{1\%}_{1\text{ cm.}}$ 147

(b) 7β-(D(—)-α-amino-α-phenylacetamido)-3-methylceph-3-em-4-carboxylic acid

7β - (D(—) - α - t - butyloxycarbonylamino-α-phenylacetamido)-3-methylceph-3-em-4-carboxylic acid benzylamine salt (28.5 g.) was converted to the free acid by acidification with N-hydrochloric acid (60 ml.) and extracted into ethyl acetate (150 ml.). The organic extract was evaporated to dryness and the residue treated with glacial acetic acid (57 ml.) and concentrated hydrochloric acid (9 ml.) at 35° for 20 mins. The solution was diluted with water (57 ml.) and shaken with diethyl ether (285 ml.) and LA2 (21 ml.). The aqueous extract was adjusted to pH 3.6 with triethylamine, diluted with acetone (240 ml.) and cooled to <0° for 2 hours. The title compound was collected by filtration, washed with acetone and with ether and dried at 40° in vacuo to yield 12.26 g. of white crystals, (68.8% of theory), $[\alpha]+151°$ (c., 1.0 in $H_2O$), $\lambda_{max.}$ $H_2O$ 261 nm. $E^{1\%}_{1\text{ cm.}}$ 228

I claim:
1. The benzylamine salt of a compound of the formula

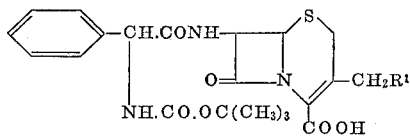

wherein $R^1$ is selected from the group consisting of hydrogen, acetoxy and azido.

2. A salt as defined in claim 1 which is selected from the group consisting of
7β-(D-α-t-butyloxycarbonylamino-α-phenylacetamido)-3-methylceph-3-em-4-carboxylic acid benzylamine salt;
7β-(D-α-t-butyloxycarbonylamino-α-phenylacetamido)-3-acetoxymethylceph-3-em-4-carboxylic acid benzylamine salt; and
7β-(D-α-t-butyloxycarbonylamino-α-phenylacetamido)-3-azidomethylceph-3-em-4-carboxylic acid benzylamine salt.

3. In a method for preparing a 7-α-aminoarylacetamido-Δ³-4-carboxy-cephalosporin wherein the aryl moiety is thienyl, phenyl or phenyl substituted by at least one of halo, hydroxy, lower alkyl, nitro, amino, lower alkanoyl, lower alkoxy or lower alkylmercapto, the steps of reacting a corresponding cephalosporin in which the α-amino group is protected, with benzylamine and separating the resulting crystalline salt.

4. A method as defined in claim 3 in which said 7-α-aminoarylacetamido - Δ³ - 4 - carboxy-cephalosporin is regenerated from the separated salt.

5. A method as defined in claim 3 in which the cephalosporin has a 7-α-aminophenylacetamido group.

6. A method as defined in claim 3 in which the α-amino group is protected by a group selected from the group consisting of a t-butoxycarbonyl and a β,β,β-trichloroethoxycarbonyl group.

References Cited
UNITED STATES PATENTS 3,352,858  11/1967  Crast et al. _____ 260—243 C NICHOLAS S. RIZZO, Primary Examiner